United States Patent
Kortschack et al.

(10) Patent No.: US 6,737,093 B1
(45) Date of Patent: May 18, 2004

(54) PROCESS FOR SOLIDIFYING THE SURFACE OF RAW SAUSAGE EMULSION BY ULTRASONIC TREATMENT

(75) Inventors: Fritz Kortschack, Katzwanger Steig 36a, D-14089 Berlin (DE); Volker Heinz, Berlin (DE)

(73) Assignee: Fritz Kortschack, Berlin (DE)

( * ) Notice: Subject to any disclaimer, the term of this patent is extended or adjusted under 35 U.S.C. 154(b) by 0 days.

(21) Appl. No.: 09/807,412

(22) PCT Filed: Oct. 14, 1999

(86) PCT No.: PCT/EP99/07750

§ 371 (c)(1),
(2), (4) Date: Aug. 30, 2001

(87) PCT Pub. No.: WO00/22943

PCT Pub. Date: Apr. 27, 2000

(30) Foreign Application Priority Data

Oct. 19, 1998 (DE) .......................... 198 49 357

(51) Int. Cl.⁷ ................................................ A23B 4/00
(52) U.S. Cl. ........................ 426/238; 426/513; 426/516
(58) Field of Search ................................ 426/238, 512, 426/513, 516; 99/451, DIG. 12

(56) References Cited

U.S. PATENT DOCUMENTS

| 4,997,663 A | | 3/1991 | Potthast ...................... 426/241 |
| 5,759,602 A | * | 6/1998 | Kobussen et al. .......... 426/513 |
| 6,146,674 A | * | 11/2000 | Manna et al. ............... 426/238 |

FOREIGN PATENT DOCUMENTS

| DE | 29 50 384 | 6/1981 |
| DE | 39 12 071 | 9/1989 |
| WO | WO 92/18011 | 10/1992 |
| WO | WO 96/35340 | 11/1996 |

OTHER PUBLICATIONS

Patent Abstract of Japan, JP 60 188046. Sep. 25, 1985.
J. B. Reynolds. et al., Journal of Food Science, vol. 43. No. 3. pp. 866–869. "Effects of Ultrasonic Treatment on Binding Strength in Cured Ham Rolls". 1978 (English Abstract only).

* cited by examiner

Primary Examiner—George C. Yeung
(74) Attorney, Agent, or Firm—Oblon, Spivak, McClelland, Maier & Neustadt, P.C.

(57) ABSTRACT

The invention relates to a proceed for solidifying the surface of raw sausage emulsion using ultrasound treatment and/or an adhesion-minimizing microstructure on the sonotrode interior surface while it is being transported, with, in the course of a continuous process, a substantial degassing of the raw product first being carried out. Subsequently, there is a direct contacting of the raw product with the surface of one or more ultrasonic sonotrodes, at least one of the ultrasonic sonotrodes being heated. As a result of the treatment, a thin, sealed, shape-stabilizing independent coagulation skin forms on the surface of the raw product. The ultrasonic energy is in the low frequency range, but has a high vibrational amplitude.

15 Claims, No Drawings

PROCESS FOR SOLIDIFYING THE SURFACE OF RAW SAUSAGE EMULSION BY ULTRASONIC TREATMENT

The invention relates to a process for solidifying the surface of raw sausage emulsion by ultrasonic treatment.

To date, sausage emulsions have been stuffed into sausage casings, then heated for stabilization, possibly simultaneously smoked or introduced directly into a hot water bath.

The raw products treated in this manner exhibit a not inconsiderable production loss inter alia of protein, flavour substances and fat. The further packaging manipulations required after the heating operation promote recontamination of the semifinished goods. To increase the shelf life, the products must frequently be additionally pasteurized in the transport packages or end-user packages.

DD patent 2009 70 discloses a process for stuffing moulding boxes for skinless sausage, which is concerned with avoiding air inclusions in scalded-emulsion sausage emulsion during filling or stuffing of the cartridges. The emulsion is introduced according to known teaching into the cartridge by shaking movements, vibrations in the ultrasonic region being described as preferred.

German laid-open application DE 29 50 384 A1 discloses a process and an apparatus for treating foods with energy of ultrasonic frequency. In detail, it is described there that the process of cooking material to be cooked is based on disintegrating the fibre structure and breaking down the enzymes of the material to be cooked and, in association therewith, on a mechanical cooking process which is based on the heat of friction in the material to be rooked. It is also explained that the action of ultrasonic energy modifies the material to be cooked in the sense of a coagulation. However, it is fundamentally assumed in DE 29 50 384 A1 that the material to be cooked, in addition to the treatment with purely thermal energy, is to be treated with ultrasound, in order to optimize the cooking process. Cooking in this context means that the entire material to be cooked is to be subjected to the corresponding process over the entire volume. Any impetus to develop an independent skin to stabilize the shape of individual raw goads by the action of ultrasonic energy, in particular to increase the intermediate stability of a semifinished product, is tot given by DE 29 50 384 A1.

From the aforesaid, it is an object of the invention to specify a process for solidifying the surface of raw sausage emulsion, for example raw scalded-emulsion sausage, raw cooked-meat sausage or raw raw-sausage emulsion, by ultrasonic treatment, in which case the treatment is to stabilize the shape of the individual raw goods and simultaneously it is necessary to avoid the raw product from adhering in an undesired manner to the treatment means.

By means of the process, a natural stabilizing and semi-protective layer is to be formed on the surface of the emulsion, so that in the case of, for example, raw sausages, a gut casing can be avoided and subsequent product ripening is also possible. Also, the process is to ensure the said prior stabilization for such products which are subjected to a later heat treatment or high-pressure treatment.

The object of the invention is achieved by a process according to the definition of Patent Claim 1, the subclaims being at least expedient embodiments and developments.

According to the invention, the raw sausage emulsion prepared in a conventional manner is first subjected to a degassing treatment, for example by evacuation. Subsequently thereto there is direct contacting of the raw product with the surface of one or more ultrasonic sonotrodes, at least one of the ultrasonic sonotrodes being heated, that is to say having an inherent temperature which is higher than that which is due to process-related heat development.

Preferably, in the context of continuous treatment, tubular hollow sonotrodes are used, with, at any rate, the use of sonotrodes which are shaping, with respect to the product, also being conceivable. The treatment surface of the sonotrodes can have an adhesion-minimizing microstructure.

The ultrasonic energy which is applied to the raw product has a low frequency, but a high vibrational amplitude, preferably the frequency range between 16 and 50 kHz being employed at an amplitude of the ultrasonic vibrations in the range of essentially 5 to 50 μm.

The molecules of the raw product which are exposed to ultrasonic energy are induced by the treatment into their normal mode of vibration, which produces frictional heat. As a result, the protein on the product surface coagulates and the desired continuous independent skin forms. The combined treatment by using a heated ultrasonic sonotrode can achieve the desired effect in an optimum manner without, as would otherwise be customary, very high ultrasonic powers in the kW range being necessary.

The depth of penetration of the ultrasonic waves into the material to be treated, which is a mixture of protein, fat, water, salts and spices is small, so that unwanted cooking right through the material is excluded.

The result of the treatment is that, during flow through a tube, which is subjected to ultrasonic vibrations and acts as sonotrode, protein denaturation is initiated at the surface of sausage emulsion, the uniformity of the stabilizing independent skin formation being improved by sausage emulsion which is substantially free from air inclusions and by heating the sonotrodes beyond the self-heating occurring during operation.

At the sonotrode inlet, liquid can be applied to the sausage emulsion surface for affecting flavour or colouring by means of, for example, an annular nozzle. The ultrasound causes a fine and uniform distribution of the liquid on the coagulating edge layer. By this means, a Subsequent flavouring (for example by smoke) or colouring post-treatment can be dispensed with, or its effect can be optimized.

However, it is also possible that the sausage emulsion stream which is solidified in such a manner is cooled and packed at the sonotrode outlet or else is subjected to a further processing or treatment, for example by liquid smoke or similar flavourings or decorations.

In one embodiment, the sausage emulsion can also be stuffed into releasable moulds which are subjected to mechanical vibrations by coupled sonotrodes.

After the surface treatment which has been completed in the above manner, a further treatment, as described, can be performed, in which case it is possible to store the raw products temporarily in the frozen state or to carry out final heat and/or high-pressure treatment immediately subsequently. In contrast to the known process, the otherwise unavoidable loss of protein, fat, flavourings etc. is decreased and the product quality is increased. At the same time, a reduction in the flow-through times in continuous production can be achieved, so that a reduction in cost is also achieved from the technological aspect. The risk of recontamination by the necessary packaging manipulation after pasteurization is excluded in the process described. By using the shaping sonotrodes mentioned, any conceivable product configuration or product shape is achievable. In the event that the emulsion for raw Bratwurst is given, for example, a ring shape or a helical shape, this shape is retained and the individual layers of the emulsion do not stick to one another.

As a result of the surface treatment of raw-sausage emulsion, the otherwise necessary shape-stabilizing gut casing can be dispensed with, so that the processability is improved and subsequent ripening is also possible.

The invention is to be described in more detail with reference to an example.

Wiener emulsion was removed from the cutter at a temperature of essentially 8° C. and, for further degassing, passed through a stuffing mincer. The feed stream of the emulsion strand was then conducted through coupled tubular hollow sonotrodes which were directly connected to the stuffing horn of the transport system. Via the feed stream the pressure in the hollow sonotrode pipe flow may be set, which demonstrates that, at a higher pressure, the input or transfer of ultrasonic energy to the raw product increased.

Heating one of the hollow sonotrodes improved homogeneity of the independent skin formation on the surface of the exiting emulsion strand, in which case the feed stream could be set to approximately 110 l/h. The denaturation occurring penetrated into the sausage emulsion to about 1 mm below the surface.

The sausage emulsion stream was then divided transversely, the sections being transferred to a perforated sheet. Unwanted adhesion of the divided sausage emulsion stream to plastic or metal surfaces was not observed. Adjacently placed sausages were, without later adhesion, placed into plastic pouches under reduced pressure and heated to 78° C.

In addition, it has been successfully demonstrated that processing the solidified surface of the sausage emulsion by spraying with liquid smoke is possible and browning is achievable.

In one embodiment of the hollow sonotrodes, these were surrounded on the exterior with a heating mat, a surface temperature in the region of approximately 140° C. having been recorded. A uniform independent skin formation occurred even at a low ultrasonic power of essentially 200 W. At a feed rate of approximately 100 l/h, the specific energy input required for independent skin formation is essentially 7 kJ/kg of ultrasonic energy and 9 kJ/kg of thermal energy.

Switching off the ultrasound during the stuffing process with simultaneous intensive heating of the sonotrodes, with some sausage emulsion compositions, did not lead, as expected, to an immediate adhesion of the protein to the sonotrode interior surface.

It can be deduced from this surprising finding that the ultrasound action is primarily preventing the previously unavoidable adhesion to the hot sonotrode interior surface during the heating process. It can be deduced from this finding that ultrasound serves especially during the initial phase to decrease the frictional resistance on the interior surface of the heated sonotrodes, while in the running process the exiting fats and liquids reduce or completely prevent adhesion. If production interruptions occur, the flow of material can be reactivated by turning on the ultrasound.

Decreasing the frictional resistance by adhesion-minimizing microstructure on the sonotrode interior surface can further minimize the use of ultrasound, more precisely both from the aspects of time and energy. However, it must be emphasized that, owing to the tendency of the sausage emulsion to adhere to the heated sonotrode interior surface in a varying composition-dependent manner, use of ultrasound is indispensable.

What is claimed is:

1. Process for solidifying the surface of a raw product including raw sausage emulsions or raw sausages by ultrasonic treatment comprising the following steps in the course of a continuous process:

degassing the raw product substantially;

directly contacting the raw product with the surface of one or more ultrasonic sonotrodes, at least one of the ultrasonic sonotrodes being heated to achieve a uniform denaturation layer;

treating the surface of the raw product with at least temporary action of ultrasonic energy in the low frequency range, but with high vibrational amplitude sufficient to form a thin, sealed, shape-stabilizing independent coagulation skin on the surface of the raw product; and transferring the ultrasonic-energy treated raw product to further processing or packaging.

2. Process according to claim 1, wherein the raw product is conducted through tubular hollow sonotrodes under pressure.

3. Process according to claim 1, wherein shaping sonotrodes are used.

4. Process according to claim 1, wherein the raw product is subjected to a synchronous treatment with liquid smoke or other flavourings or decorations.

5. Process according to claim 1, wherein the raw product is subjected to a downstream treatment with liquid smoke or other flavourings or decorations.

6. Process according to claim 1, wherein the raw product is evacuated, for degassing, prior to the ultrasonic treatment.

7. Process according to claim 2, wherein the surface of the sonotrode to be contacted with the raw product has an adhesion-minimizing microstructure or structured coating.

8. Process according to claim 2, wherein the raw product is subjected to a synchronous treatment with liquid smoke or other flavourings or decorations.

9. Process according to claim 3, wherein the raw product is subjected to a synchronous treatment with liquid smoke or other flavourings or decorations.

10. Process according to claim 2, wherein the raw product is subjected to a downstream treatment with liquid smoke or other flavourings or decorations.

11. Process according to claim 3, wherein the raw product is subjected to a downstream treatment with liquid smoke or other flavourings or decorations.

12. Process according to claim 3, wherein the surface of the sonotrode to be contacted with the raw product has an adhesion-minimizing microstructure or structured coating.

13. Process according to claim 4, wherein the surface of the sonotrode to be contacted with the raw product has an adhesion-minimizing microstructure or structured coating.

14. Process according to claim 5, wherein the surface of the sonotrode to be contacted with the raw product has an adhesion-minimizing microstructure or structured coating.

15. Process according to claim 6, wherein the surface of the sonotrode to be contacted with the raw product has an adhesion-minimizing microstructure or structured coating.

* * * * *

UNITED STATES PATENT AND TRADEMARK OFFICE
CERTIFICATE OF CORRECTION

PATENT NO.    : 6,737,093 B1
DATED         : May 18, 2004
INVENTOR(S)   : Kortschack et al.

It is certified that error appears in the above-identified patent and that said Letters Patent is hereby corrected as shown below:

<u>Title page, Item [54] and Column 1, line 1,</u>
Title, should read:
-- [54]  METHOD FOR HARDENING THE SURFACE OF SAUSAGE MEAT USING ULTRASONIC TREATMENT --

Signed and Sealed this

Ninth Day of November, 2004

JON W. DUDAS
*Director of the United States Patent and Trademark Office*